(12) United States Patent
Jin

(10) Patent No.: US 6,349,374 B1
(45) Date of Patent: Feb. 19, 2002

(54) MEMORY CONTROL APPARATUS AND METHOD FOR DIGITAL SIGNAL PROCESSOR (DSP) HAVING PIPELINE STRUCTURE

(75) Inventor: Seong-Ae Jin, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 08/998,093

(22) Filed: Dec. 24, 1997

(30) Foreign Application Priority Data

Dec. 24, 1996 (KR) ............................................ 96-71311

(51) Int. Cl.[7] .............................................. G06F 13/00
(52) U.S. Cl. .......................... 711/169; 711/118; 712/35
(58) Field of Search ................................. 711/118, 170, 711/169, 130, 100, 209, 114, 138, 139, 120, 144, 217; 712/221, 205, 35

(56) References Cited

U.S. PATENT DOCUMENTS

| | | | | |
|---|---|---|---|---|
| 4,794,524 A | * | 12/1988 | Carberry | 712/32 |
| 5,440,717 A | * | 8/1995 | Bosshart | 711/159 |
| 5,517,657 A | * | 5/1996 | Rodgers | 711/169 |

* cited by examiner

Primary Examiner—Glenn Gossage

(57) ABSTRACT

A DSP (Digital Signal Processor) having a pipe line structure which is capable of decreasing the time required for storing a result of a computation. Data stored in a cache memory is output when an instruction input into a judging unit is a judged to be a computation instruction and when an address of the stored data is the same as a previously stored address in the judging unit. The cache memory temporarily stores data inputted through a decoder and is controlled by the judging unit.

14 Claims, 5 Drawing Sheets

MEMORY CONTROL APPARATUS AND METHOD FOR DIGITAL SIGNAL PROCESSOR (DSP) HAVING PIPELINE STRUCTURE

BACKGROUND OF THE INVENTION

1. Field of the Invention

The present invention relates to a memory control apparatus for a digital signal processor (DSP) having a pipeline structure, and in particular to an improved memory control apparatus for a digital signal processor having a pipeline structure which is capable of implementing a fast storing and computing operation by providing a cache memory for temporarily storing a data inputted through a decoder.

2. Description of the Background Art

FIG. 1 illustrates the construction of a conventional memory control apparatus for a digital signal processor (DSP) having a pipeline structure. As shown therein, the conventional memory control apparatus for a DSP having a pipeline structure includes a ROM (Read Only Memory) 40 for storing an execution program therein, a data storing block 30 provided with a plurality of RAMs (Random Access Memories) for storing a computation data therein, a decoder 10 for decoding an instruction INST and a data DATA and outputting a control code CTL, an address ADDR and a data DATA based on the decoding operation, and a memory management unit 20 for receiving the control code CTL, address ADDR and data from the decoder 10 and controlling an input/output operation of a data of the ROM 40.

Differently from the common processor, since the digital signal processor performs a computation based on an accumulator and a product register, a result of the computation is frequently stored in the memory. Therefore, the DSP processor has a three-step pipeline structure as shown in FIG. 2 or a four-step pipeline structure as shown in FIG. 3 for enabling a high speed data processing operation.

The processor having a three-step pipeline structure is performed by the following steps: an instruction fetch (IF) step in which an instruction to be executed is read, a decoding (D) step in which the read instruction is decoded, and an execution (E) step. Since the data which is used during the computation operation should be generated between the decoding step and the execution step, it is impossible to enable a high speed operation which is required in an application algorithm, and in addition, since more than one clock signal is internally used, it is impossible to maintain a uniformity of a design.

Therefore, in order to overcome the above-described problems, a four-step pipeline structure including a step for reading data is mainly used.

The DSP processor adapting the four-step pipeline structure performs the following steps: an instruction fetch (IF) step, a decoding (D) step, an operand fetch (OF) step in which a data used for a computation is read, and an execution step (E).

The operation of the conventional apparatus in which the fourth step is executed will be explained.

The decoder 10 decodes an instruction inputted and transfers a control code CTL, an address ADDR and a data DATA to a memory management unit 20, respectively, based on the decoding operation. The memory management unit 20 judges the control code CTL and activates a corresponding memory among an N-number of RAMs or ROM40 of the data storing block 30, or ROM 40 which corresponding memory is designated by the address ADDR. Therefore, a new data is stored into a corresponding memory, or the stored data is externally outputted through a data bus, so that an operation can be externally performed.

When an addition instruction is read in the instruction fetch (IF) step of the first pipeline line I of FIG. 3, and an addition operation is performed in the execution step (E), the operational result value is stabilized in the execution step (E). If a storing instruction is read in an instruction fetch (IF) step of a second pipe (II), the memory management unit 20 activates a memory designated by an address (ADDR) in a number N of RAMs or ROMs of the data storing block 30 during the operand fetch (OF) step, when a computation result value is stabilized. The computation result value is stored in the activated memory. The time when the operational result is stored into an accumulator or an accumulating register corresponds to the operand fetch (OF) step which is indicated by * as shown in FIG. 3. In addition, the accumulator and accumulating register (not shown) are connected with the data bus BUS.

Since the time when the value from the accumulator or accumulating register is stabilized is later than the operand fetch (OF) step of the next instruction, namely, since the time when the data is stored is earlier than the time when the data to be stored is stabilized, one cycle is further needed so that the instruction is executed for storing the data. Therefore, in the operand fetch (OF) step (*), the data are not stored. Namely, the data are stored in the operand fetch (OF) step () of the third pipeline III. In addition, the addition operation after the storing step is performed in the operand fetch (OF) step (*) of the fourth pipeline IV.

Therefore, one cycle is further needed for a data computation. In addition, for the data storing operation, one cycle is further needed, so that two cycles are totally needed for the data storing operation, and thus the system operation is delayed due to the extended data storing time.

In the DSP in which a computation is performed based on the accumulator, since all computations are performed based on the accumulator or accumulating register, and there are many steps for storing the data, the delay time which occurs in the data storing step becomes an important factor by which the processing performance of the DSP is decreased.

SUMMARY OF THE INVENTION

Accordingly, it is an object of the present invention to provide a memory control apparatus for a digital signal processor (DSP) having a pipeline structure which overcomes the aforementioned problems encountered in the background art.

It is another object of the present invention to provide memory control apparatus for a digital signal processor having a pipeline structure which is capable of implementing a fast storing and computing operation by providing a cache memory for temporarily storing a data inputted through a decoder.

To achieve the above objects, there is provided a memory control apparatus for a digital signal processor (DSP) having a pipeline structure, including: a ROM (Read Only Memory) for storing an execution program therein; a data storing block composed of a plurality of RAMs (Random Access Memories) for storing data therein; a decoder for decoding an instruction and associated data and outputting a control code, address and the associated data; a memory management unit; a judging unit for comparing the control code and the address outputted from the decoder with a previously stored control code and address, respectively, outputting an enable signal if the compared addresses are the same based on the comparison, and outputting the previously stored control code and address to the memory management unit if the compared addresses are not the same; and a cache memory for storing the associated data from the decoder, outputting the stored data to the outside through a data bus in accordance with a logic state of the enable signal and outputting the stored data to the memory management unit; wherein the memory management unit receives the previously stored control code and address from the judging unit and the stored data from the cache memory and controls data transfer to and from the data storing block and ROM.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
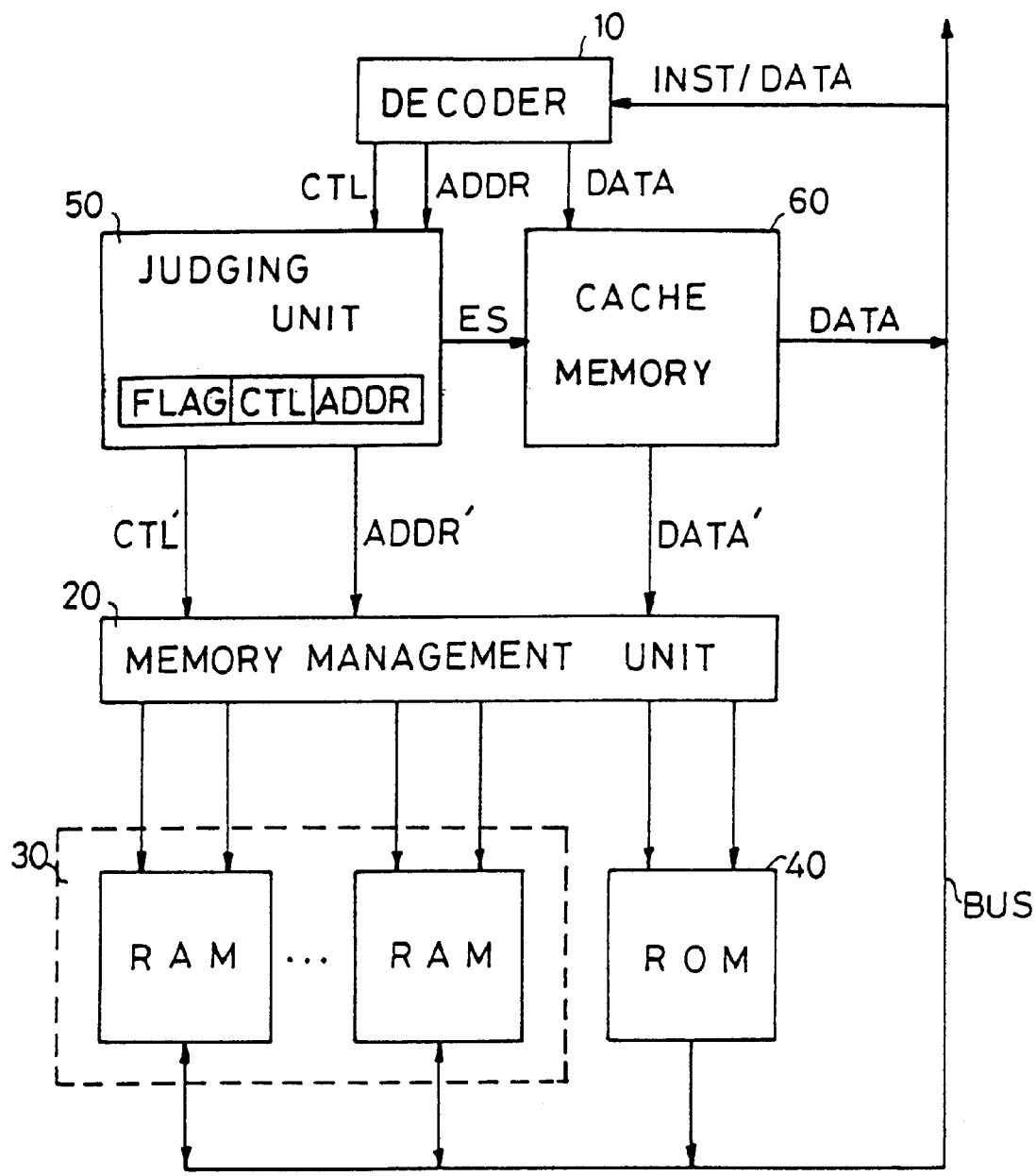
FIG. 4 is a block diagram illustrating the construction of a memory control apparatus for a digital signal processor (DSP) having a pipeline structure according to the present invention.

FIG. 4 is a block diagram illustrating the construction of a memory control apparatus for a digital signal processor (DSP) having a pipeline structure according to the present invention. As shown therein, the constructions of the ROM 40, the data storing block 30, the decoder 10, and the memory management unit 20 are identical to the conventional apparatus except the following elements.

First, a judging unit 50 compares a control code CTL and an address ADDR from the decoder 10 and previously inputted control code CTL' and address ADDR' and outputs an enable signal ES based on a result of the comparison, and outputs the previously inputted control code CTL' and address ADDR' to the memory management unit 20.

A cache memory 60 stores a data DATA which is outputted from the decoder 10 and composed of one word length corresponding to a size for storing a data DATA outputted from the decoder 10, and outputs the stored data DATA to the outside through the data bus or to the memory management unit 20.

The judging unit 50 is composed of a flag region indicating a state that a data is stored in the cache memory 60, a control code region in which a control code is stored, and an address region in which an address is stored. When the data is stored in the cache memory 60, the flag of the flag region is set "1".

The operation and effects of the memory control apparatus for a digital signal processor (DSP) having a pipeline structure according to the present invention will now be explained with reference to the accompanying drawings.

The decoder 10 decodes an instruction INST inputted, and outputs a control code and address ADDR obtained based on the decoding operation to the judging unit 50 and outputs the data DATA to the cache memory 60.

Figure 6:
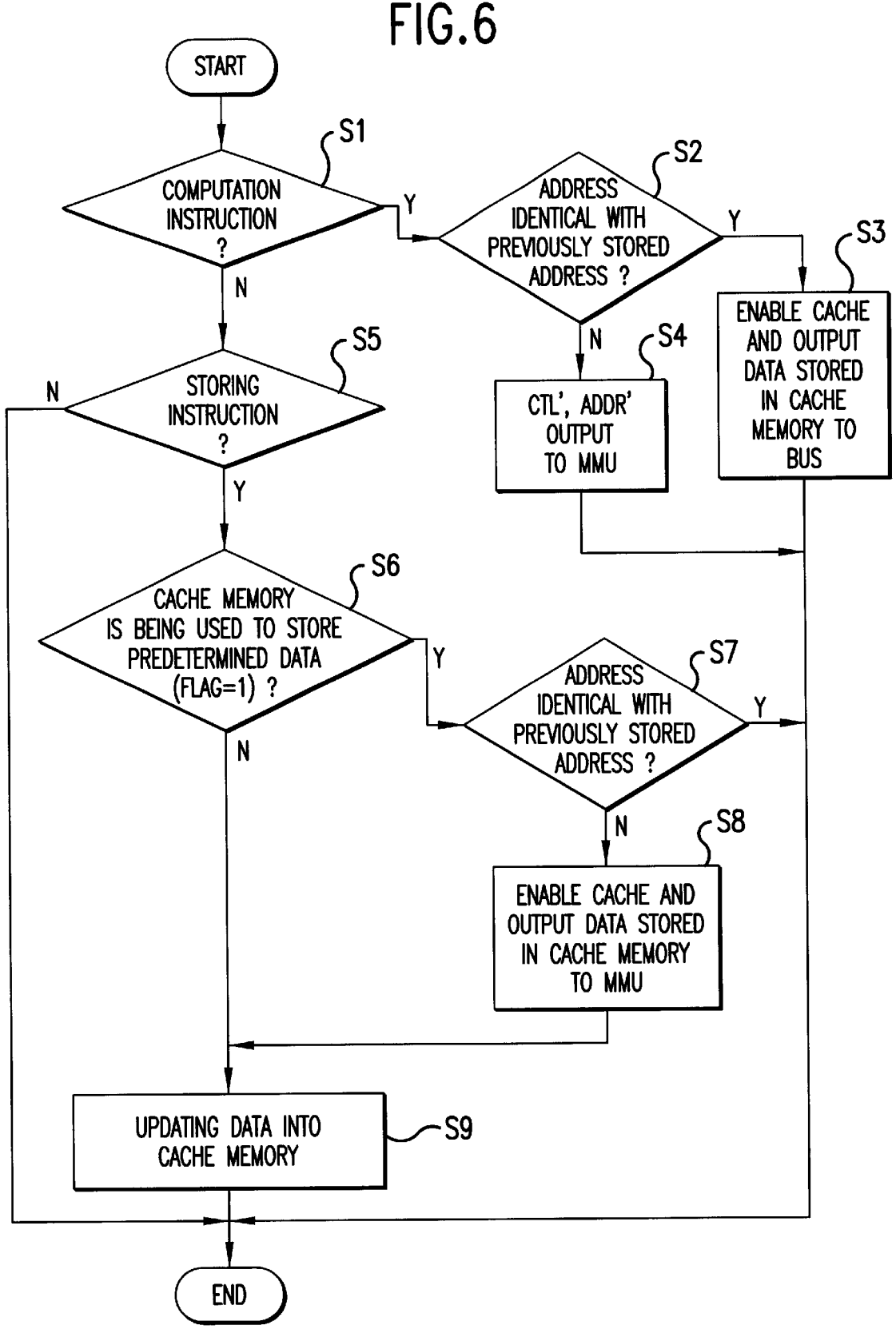
FIG. 6 is a flow chart illustrating an operation of a cache memory of FIG. 4.

The data DATA are stored in the cache memory 60, and the judging unit 50 stores the control code CTL and address ADDR and judges whether the instruction from the decoder 10 is a storing instruction or a computation instruction, thus performing according to the flow chart shown in FIG. 6.

If the inputted instruction is a computation instruction in Step S1, the judging unit 50 compares the address ADDR with the previously stored address ADDR' in Step S2. As a result of the comparison, if both addresses ADDR and ADDR' are identical, an enable signal ES is outputted so that the cache memory 60 outputs the stored data DATA' to the outside through the data bus thereby in Step S3. As a result of the comparison, if the addresses ADDR and ADDR' are different, the previously inputted control code CTL' and address ADDR' are outputted to the memory management unit 20 in Step S4. Thereafter, the memory management unit 20 activates a corresponding RAM among the N-number of RAMs of the data storing block 30.

If the inputted instruction is a storing instruction in Step S5, the judging unit 50 judges whether the internal flag is "1". If the flag is set to "1", it means that a predetermined data is stored in the cache memory 60 in the storing step of the previous pipeline in Step S6. If the flag is 0, it means that no data is stored in the cache memory 60. Therefore, the data DATA is stored into the cache memory 60.

If the flag is set to "1", it is compared whether the address ADDR and the previously stored ADDR' are identical in Step S7. If both the addresses ADDR and ADDR' are identical, the value stored in the cache memory 60 in the previous step is continuously maintained. If both the addresses ADDR and ADDR' are different, the enable signal ES is outputted, and the data DATA' stored in the cache memory 60 is outputted to the memory management unit 20 in Step S8. The data DATA inputted into the memory management unit 20 is stored in Step S9.

The operations of the judging unit 50 and cache memory 60 will be explained with reference to the accompanying drawings.

Figure 5:
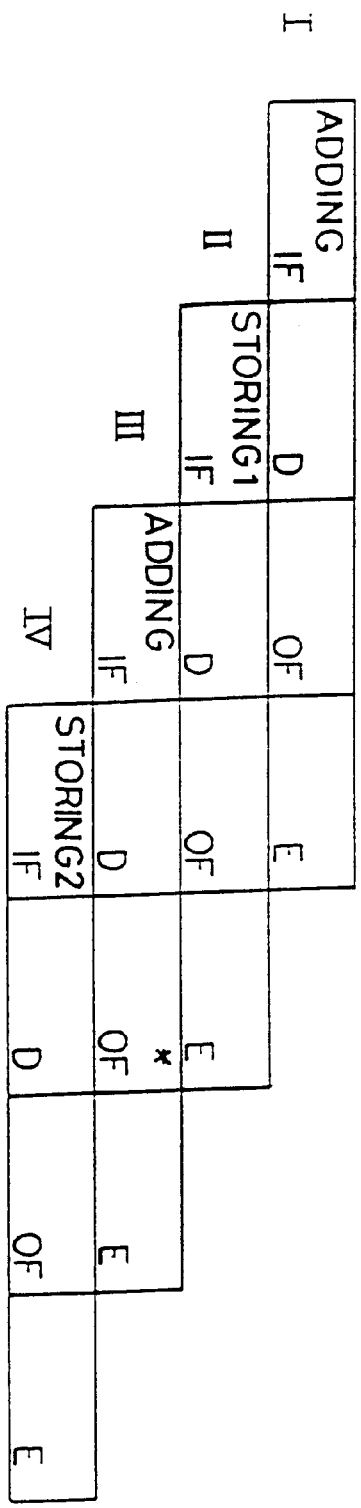
FIG. 5 is a view illustrating a four-step pipeline structure of FIG. 4.

FIG. 5 is a view illustrating a four-step pipeline structure of FIG. 4.

As shown therein, when a storing instruction is read in the instruction fetch (IF) step of the second pipeline II, the judging unit 50 recognizes the storing instruction from the control code CTL and stores the inputted address ADDR, and then the current flag is confirmed in Steps S1, S5 and S6. The current flag is set to "1", and the data DATA is stored in the cache memory 60. The above-described operation is performed in the execution step (E) in Step S9.

Next, when the addition instruction is read in the instruction fetch (IF) step of the third pipeline III, the judging unit 50 judges whether the currently inputted address ADDR is identical with the address ADDR' stored in the second pipeline II. As a result of the judgement, if both the addresses ADDR and ADDR' are different, the control code CTL' and address ADDR' are outputted to the memory management unit 20 in Steps S1, S2 and S4. In addition, if both the addresses ADDR and ADDR' are identical, the enable signal ES is outputted, so that the data DATA' stored in the cache memory 60 is outputted to the outside through the data bus BUS. The above-described step is performed in the operand fetch (OF) step (*) in Step S3. Here, the case that both the addresses ADDR and ADDR' are identical denotes that the data stored in the second pipeline II are computed in the third pipeline III.

Figure 1:
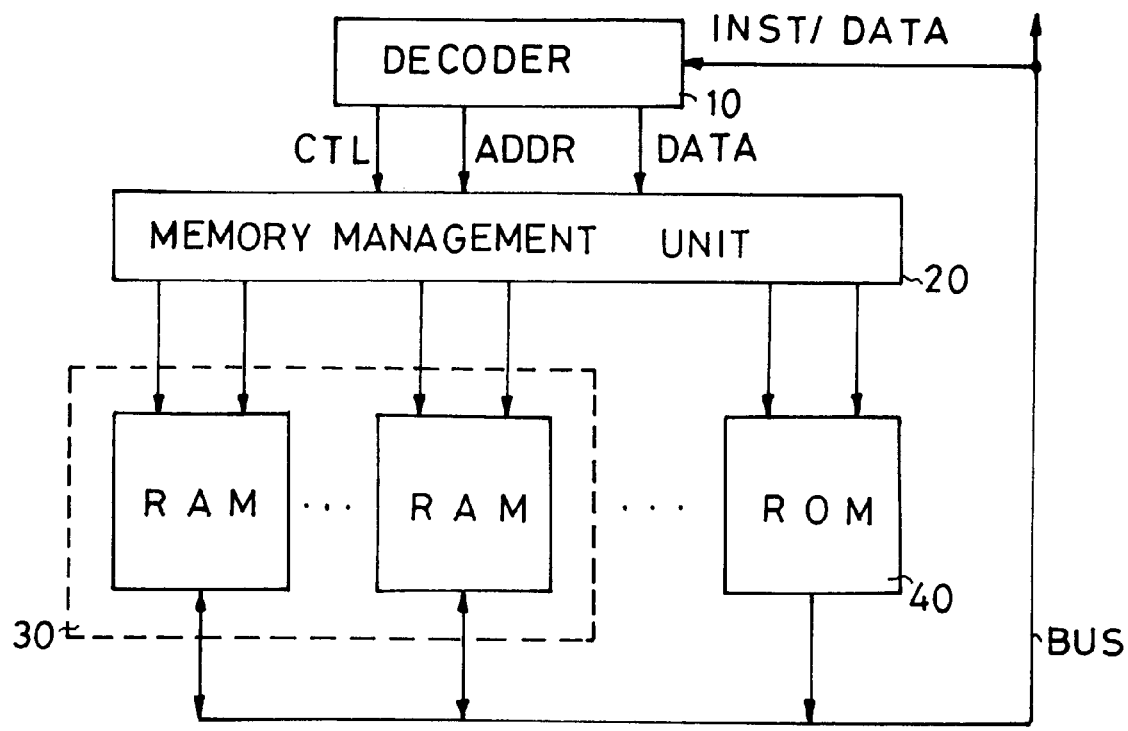
FIG. 1 is a block diagram illustrating the construction of a conventional memory control apparatus for a digital signal processor (DSP) having a pipeline structure.
Figure 2:
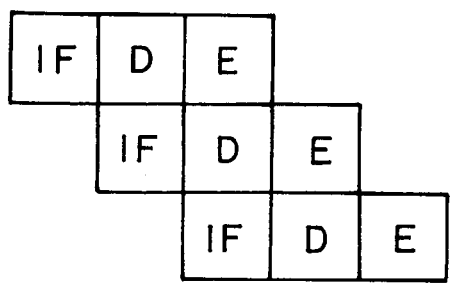
FIG. 2 is a view illustrating a conventional three-step pipeline structure.
Figure 3:
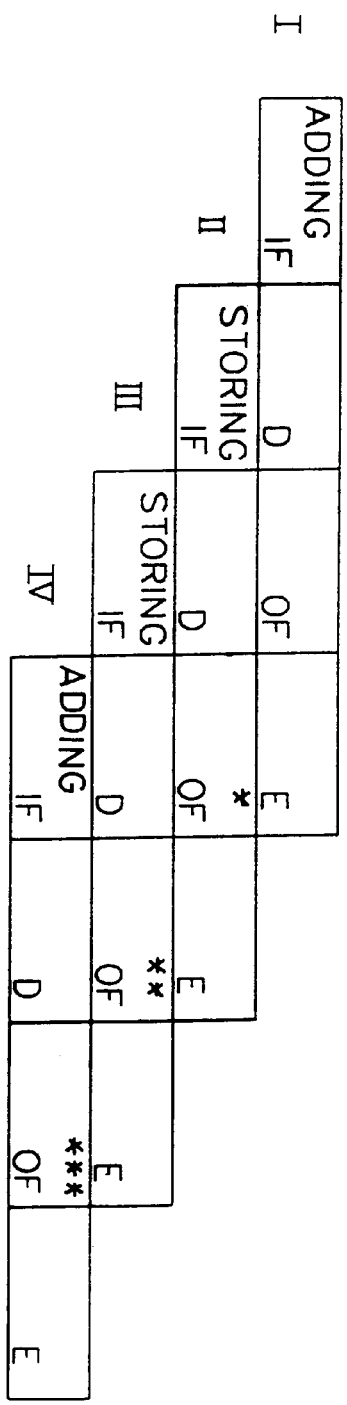
FIG. 3 is a view illustrating a conventional four-step pipeline structure.

In the conventional art, since the data is not stored in the operand fetch (OF) step (*) of the second pipeline II shown in FIG. 3 but in the operand (OF) step () of the third pipeline III, the data stored in the operand fetch (OF) step (*) of the fourth pipeline IV is read. However, in the present invention, the data stored in the operand fetch (OF) step (*) of the third pipeline III in FIG. 5 is read.

Next, if the storing instruction is read in the instruction fetch (IF) step of the fourth pipeline IV, the judging unit 50 judges the flag. If the flag is set to "1", the address ADDR and the previously stored address ADDR' are compared in Step S7. As a result of the comparison, if both the addresses ADDR and ADDR' are different, the enable signal ES is outputted, and a newly inputted data DATA is stored into the cache memory 60 in Step S9. The data DATA' stored in the cache memory 60 is outputted to the memory management unit 20. The above-described operation is executed in the execution step (E) in Step S8. The fourth pipeline IV denotes that a new data is stored. Therefore, a new data is stored in the cache memory 60. The previously stored data is transferred to the memory management unit 20.

As described above, in the conventional art, the stored data is stored into the RAM of the memory block, and after the accumulator or product register are stabilized, the stored data are used for a computation. However, in the present invention, the data are temporarily stored in the cache memory having a size of one word, and in the next step, the computation is performed, so that the data stored in the cache memory are outputted, and thus the delay time which is required for the storing operation is not necessary in the present invention.

Therefore, in the present invention, the processing capacity of the DSP is increased by decreasing the time which is required for storing a result of the computation. Furthermore, the shortening of the time which is required for the storing operation is very important for increasing the performance of the DSP.

In the present invention, the cache memory is separately configured. More preferably, the cache memory may be configured in the decoder 10 or the memory management unit 20.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A memory control apparatus for a digital signal processor (DSP) having a pipeline structure, comprising:
    a ROM (Read Only Memory) for storing an execution program therein;
    a data storing block composed of a plurality of RAMs (Random Access Memories) for storing data therein;
    a decoder for decoding an instruction and associated data and outputting a control code, an address and the associated data;
    a memory management unit;
    a judging unit for comparing the control code and the address outputted from the decoder with a previously stored control code and address, respectively, outputting an enable signal if the compared addresses are the same based on the comparison, and outputting the previously stored control code and address to the memory management unit if the compared addresses are not the same; and
    a cache memory for storing the associated data from the decoder, outputting the stored data to the outside through a data bus in accordance with a logic state of the enable signal and outputting the stored data to the memory management unit;
    wherein the memory management unit receives the previously stored control code and address from the judging unit and the stored data from the cache memory and controls data transfer to and from the data storing block and ROM.

2. The apparatus of claim 1, wherein said judging unit is composed of a flag region, which denotes a state that data is stored in the cache memory, a control code region in which the previously stored control code is stored therein, and an address region in which the previously stored address is stored therein.

3. The apparatus of claim 2, wherein a flag of said flag region is set to "1" when data is stored in the cache memory.

4. The apparatus of claim 1, wherein said judging unit compares a previously stored address with the address from the decoder when the instruction is a computation instruction, and judges that the data stored in the cache memory is to be outputted when the compared addresses are the same, thus outputting an enable signal based on a result of the judgment.

5. The apparatus of claim 1, wherein said judging unit compares the address outputted from the decoder with the previously stored address when the instruction is a storing instruction, and outputs an enable signal so that the data stored in the cache memory is updated when the compared addresses are different.

6. The apparatus of claim 1, wherein said cache memory has a size which is capable of storing one word.

7. A method of controlling memory in a digital signal processor, comprising:
    decoding an instruction and associated data, and outputting a control code, an address, and the associated data;
    determining whether the control code is a computation instruction;
    comparing the address with a stored address in a judging unit if the control code is a computation instruction;
    determining whether the control code is a storing instruction if the control code is not a computation instruction;
    checking if a cache memory contains stored data when the control code is a storing instruction; and
    storing the data into the cache memory if the control code is a storing instruction unless the cache memory is being used and the address is the same as the stored address.

8. The method of claim 7, further comprising:
    outputting data stored in the cache memory to the bus if the comparing step determines that the address is the same as the stored address; and
    outputting a stored control code and the stored address from the judging unit to a memory management unit if the comparing step determines that the address is not the same as the stored address.

9. The method of claim 7, further comprising:
    outputting data stored in the cache memory to a memory management unit if the checking step determines that the address is not the same as the stored address.

10. A memory control apparatus for a digital signal processor, comprising:
- a decoder for decoding an instruction and associated data, and outputting a control code, an address, and the associated data;
- a judging unit, containing a stored control code and a stored address, to compare the outputted control code and address from the decoder with the stored control code and the stored address, and to selectively output the stored control code, the stored address, and an enable signal;
- a cache memory to store the data from the decoder based on the enable signal from the judging unit, and to selectively output the stored data; and
- a memory management unit to receive the stored data from the cache memory and the stored control code and stored address from the judging unit.

11. The apparatus of claim 10, wherein if the control code is a computation instruction, and if the address output by the decoder and the stored address are identical, the judging unit outputs the enable signal to the cache memory, causing the cache memory to output the stored data to a bus.

12. The apparatus of claim 10, wherein if the control code is a computation instruction, and if the address output by the decoder and the stored address are different, the judging unit outputs the stored control code and the stored address to the memory management unit.

13. The apparatus of claim 10, wherein if the control code is a storing instruction, and if the cache memory does not contain stored data, the cache memory stores the data from the decoder.

14. The apparatus of claim 10, wherein if the control code is a storing instruction, and if the cache memory contains stored data, and if the stored address is different from the address output by the decoder, the cache memory outputs the stored data to the memory management unit.

* * * * *